United States Patent
Yu et al.

(10) Patent No.: US 11,874,664 B2
(45) Date of Patent: Jan. 16, 2024

(54) MOVER ROBOT SYSTEM AND CONTROLLING METHOD FOR THE SAME

(71) Applicant: LG ELECTRONICS INC., Seoul (KR)

(72) Inventors: Kyungman Yu, Seoul (KR); Jongjin Woo, Seoul (KR); Kyuchun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 769 days.

(21) Appl. No.: 17/042,380

(22) PCT Filed: Feb. 20, 2019

(86) PCT No.: PCT/KR2019/002045
§ 371 (c)(1),
(2) Date: Sep. 28, 2020

(87) PCT Pub. No.: WO2019/194415
PCT Pub. Date: Oct. 10, 2019

(65) Prior Publication Data
US 2021/0360849 A1    Nov. 25, 2021

Related U.S. Application Data

(60) Provisional application No. 62/653,567, filed on Apr. 6, 2018.

(30) Foreign Application Priority Data

Jan. 28, 2019    (KR) ........................ 10-2019-0010730

(51) Int. Cl.
*G05D 1/02*    (2020.01)
*G05D 1/00*    (2006.01)
(Continued)

(52) U.S. Cl.
CPC ......... *G05D 1/0219* (2013.01); *A01D 34/008* (2013.01); *A01D 34/86* (2013.01);
(Continued)

(58) Field of Classification Search
None
See application file for complete search history.

(56) References Cited

U.S. PATENT DOCUMENTS 4,674,048 A    6/1987    Okumura
6,671,592 B1   12/2003   Bisset et al.
(Continued)

FOREIGN PATENT DOCUMENTS

DE    10-2010-041309    3/2012
EP    0382693           8/1990
(Continued)

OTHER PUBLICATIONS

European Search Report dated Sep. 14, 2021 issued in Application No. 19780551.8.
(Continued)

*Primary Examiner* — Todd Melton
*Assistant Examiner* — Jason R Roberson
(74) *Attorney, Agent, or Firm* — KED & ASSOCIATES

(57) ABSTRACT

Disclosed are a mover robot system and a controlling method for the same, in which a manipulation of a control screen where a remote control is performed is restricted if a mover robot is located in an area other than a driving area, and a locked screen requesting an input of a preset use code is displayed on a terminal, whereby a display of the locked screen is maintained or released in accordance with the input code.

12 Claims, 9 Drawing Sheets

(51) Int. Cl.
  *A01D 34/00*   (2006.01)
  *B60L 53/36*   (2019.01)
  *B60L 53/16*   (2019.01)
  *A01D 34/86*   (2006.01)
  *A01D 101/00*  (2006.01)

(52) U.S. Cl.
  CPC .............. *B60L 53/16* (2019.02); *B60L 53/36* (2019.02); *G05D 1/0038* (2013.01); *G05D 1/0088* (2013.01); *G05D 1/0214* (2013.01); *G05D 1/0225* (2013.01); *G05D 1/0259* (2013.01); *G05D 1/0276* (2013.01); *A01D 2101/00* (2013.01); *B60L 2200/40* (2013.01); *G05D 2201/0208* (2013.01)

(56) References Cited

U.S. PATENT DOCUMENTS

| | | |
|---|---|---|
| 2003/0023356 A1 | 1/2003 | Keable |
| 2004/0236468 A1 | 11/2004 | Taylor et al. |
| 2005/0113990 A1 | 5/2005 | Peless et al. |
| 2006/0149465 A1 | 7/2006 | Park et al. |
| 2006/0212191 A1 | 9/2006 | Saeki |
| 2008/0221729 A1 | 9/2008 | Lavarec |
| 2013/0041526 A1 | 2/2013 | Ouyang |
| 2014/0025201 A1 | 1/2014 | Ryu et al. |
| 2016/0057925 A1 | 3/2016 | Letsky |
| 2016/0157422 A1* | 6/2016 | Köhler .................. A01G 25/09 700/275 |
| 2016/0282868 A1 | 9/2016 | Yamamura et al. |
| 2016/0282869 A1 | 9/2016 | Yamamura et al. |
| 2018/0004217 A1 | 1/2018 | Biber et al. |

FOREIGN PATENT DOCUMENTS

| | | |
|---|---|---|
| EP | 2870852 | 5/2015 |
| EP | 3135437 | 3/2017 |
| JP | 2748281 | 5/1998 |
| JP | 2001-344017 | 12/2001 |
| KR | 10-2007-0106864 | 11/2007 |
| KR | 10-0963783 | 6/2010 |
| KR | 10-2010-0118454 | 11/2010 |
| KR | 10-2011-0090702 | 8/2011 |
| KR | 10-2013-0039623 | 4/2013 |
| KR | 10-1513050 | 4/2015 |
| KR | 10-2016-0128123 | 11/2016 |
| WO | WO 2010/077198 | 7/2010 |
| WO | WO 2015/072897 | 5/2015 |
| WO | WO 2016/198822 | 12/2016 |
| WO | WO 2017/083896 | 5/2017 |

OTHER PUBLICATIONS

International Search Report dated Jul. 1, 2019 issued in Application No. PCT/KR2019/002045.
Korean Office Action dated Jun. 16, 2020 issued in Application No. 10-2019-0010730.
International Search Report dated Aug. 5, 2019 issued in Application No. PCT/KR2019/004046.
European Search Report dated Nov. 8, 2021 issued in Application No. 19781396.7.
Korean Office Action dated Aug. 20, 2020 issued in Application No. 10-2019-0040034.
Australian Examination Report dated Sep. 30, 2021 issued in Application No. 2019248256.
International Search Report dated Aug. 1, 2019 issued in Application No. PCT/KR2019/004051.
European Office Action dated May 16, 2022 issued in Application No. 19782249.7.
European Search Report dated Oct. 1, 2021 issued in Application No. 19782249.7.
Australian Examination Report dated Sep. 30, 2021 issued in Application No. 2019248257.
Australian Examination Report dated Sep. 30, 2021 issued in Application No. 2019248255.
Australian Examination Report dated Sep. 30, 2021 issued in Application No. 2019248254.
European Search Report dated Mar. 31, 2022 issued in Application No. 19781053.4.

\* cited by examiner

[Fig. 1a]
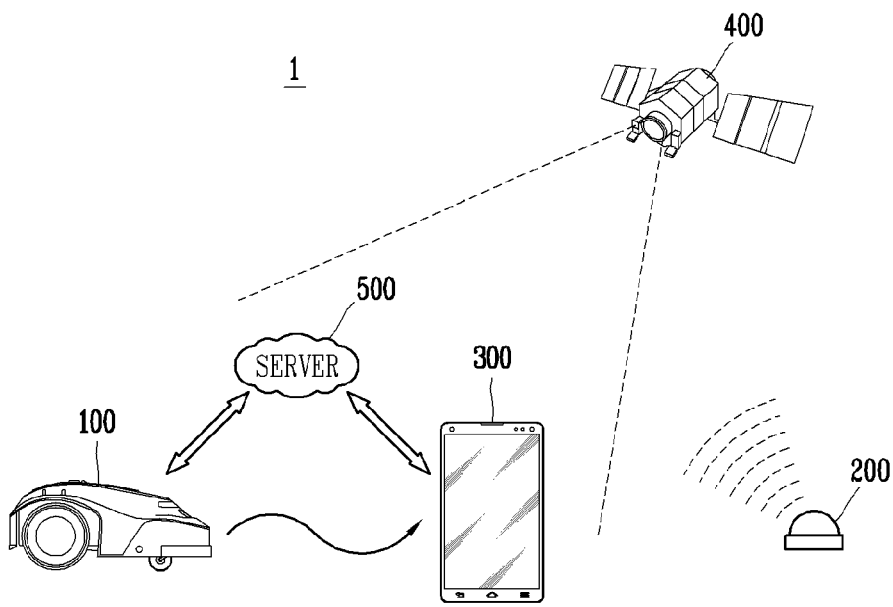
[Fig. 1b]
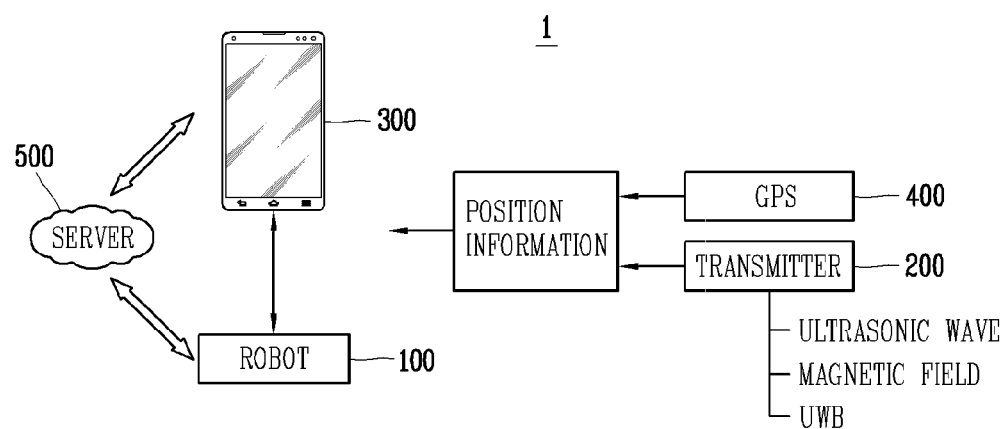

[Fig. 2]
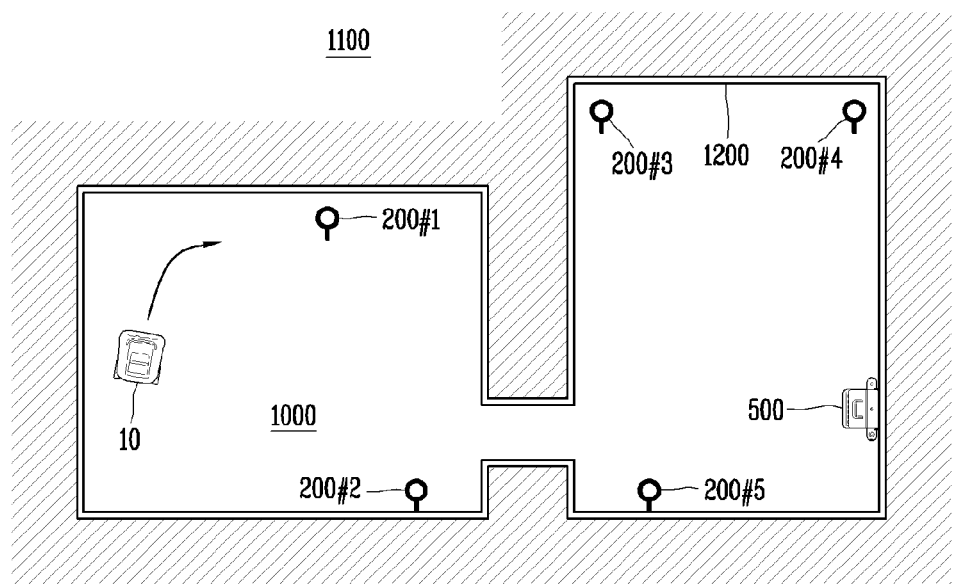
[Fig. 3a]
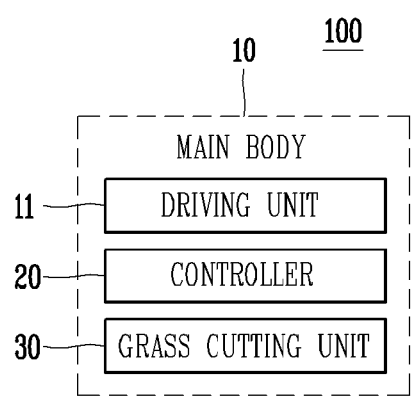

[Fig. 3b]
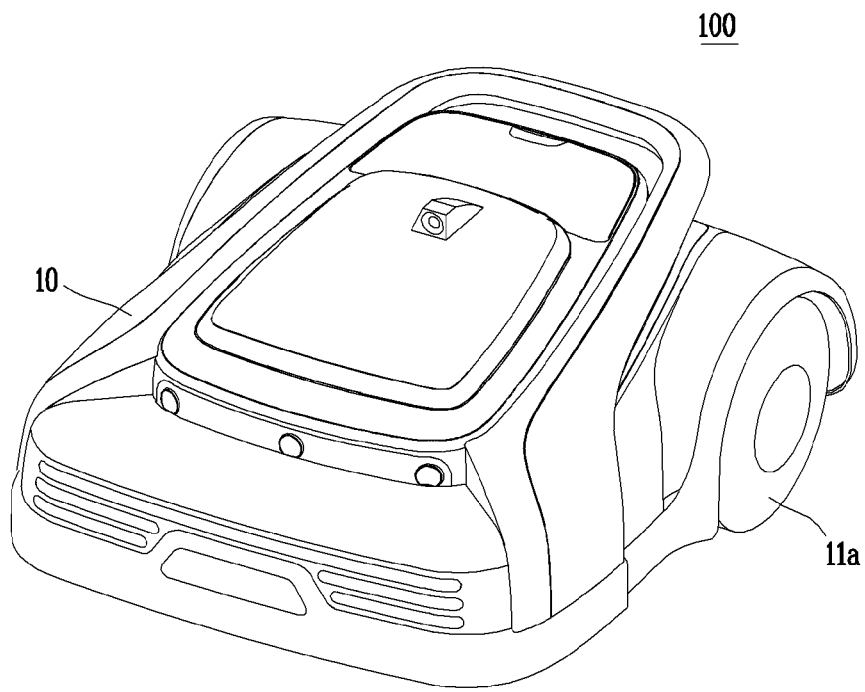
[Fig. 3c]
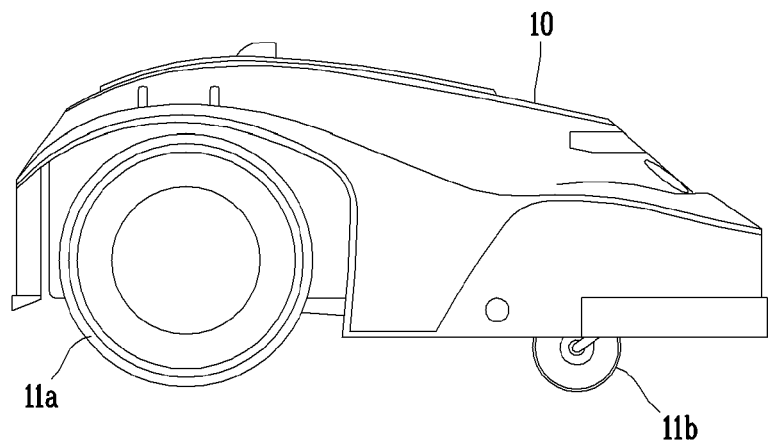

[Fig. 4]
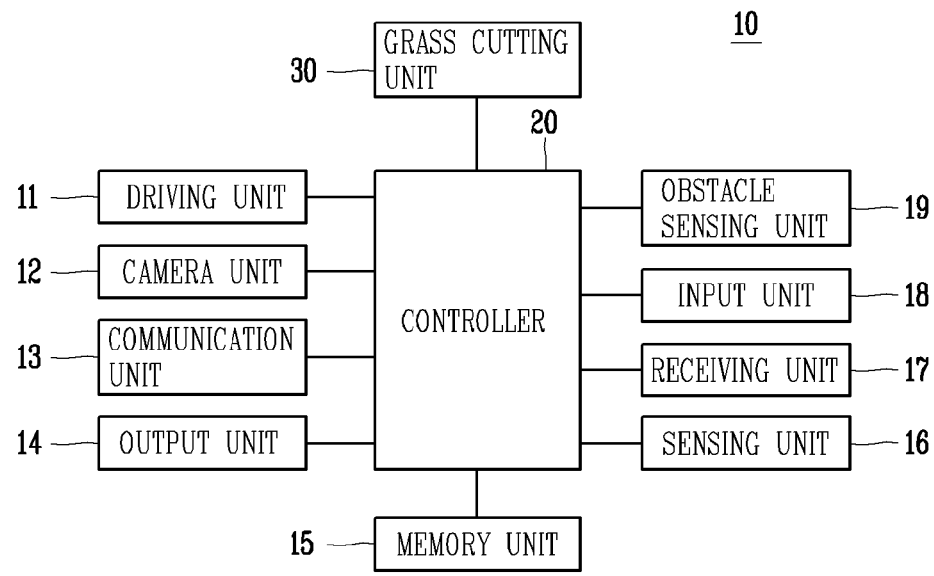
[Fig. 5]
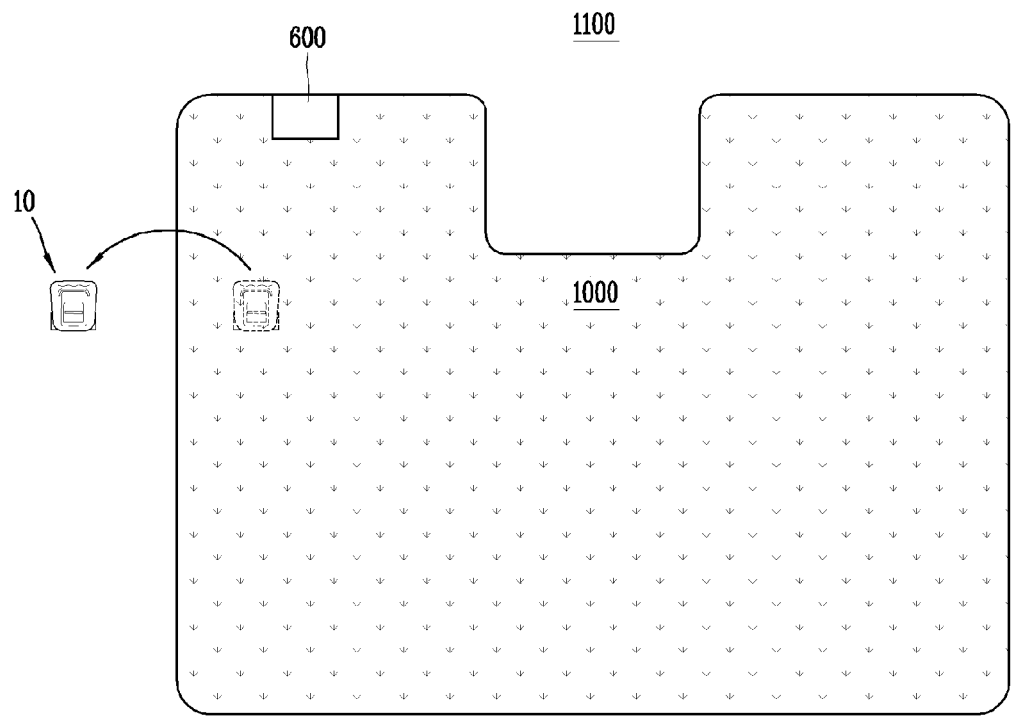

[Fig. 6]
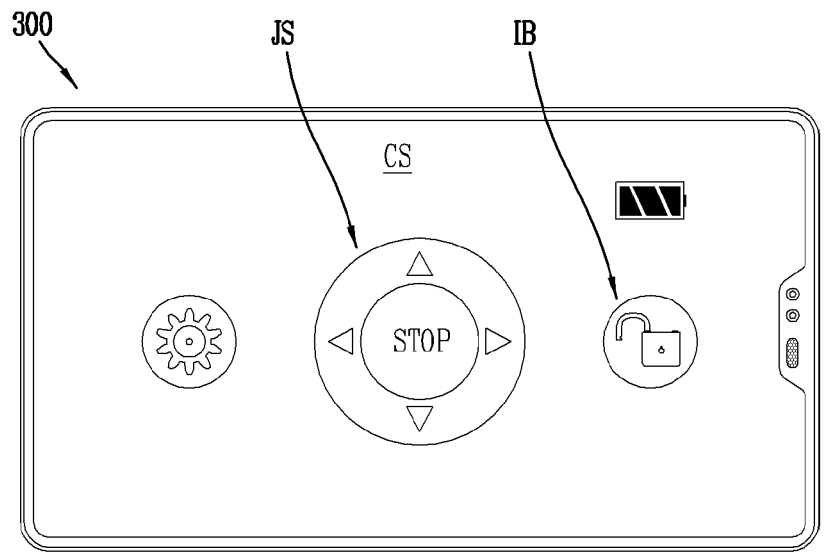
[Fig. 7a]
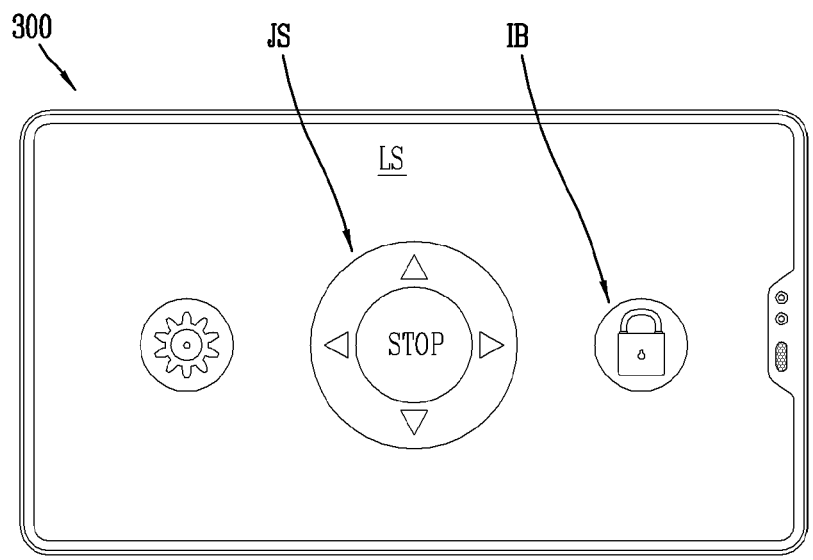

[Fig. 7b]
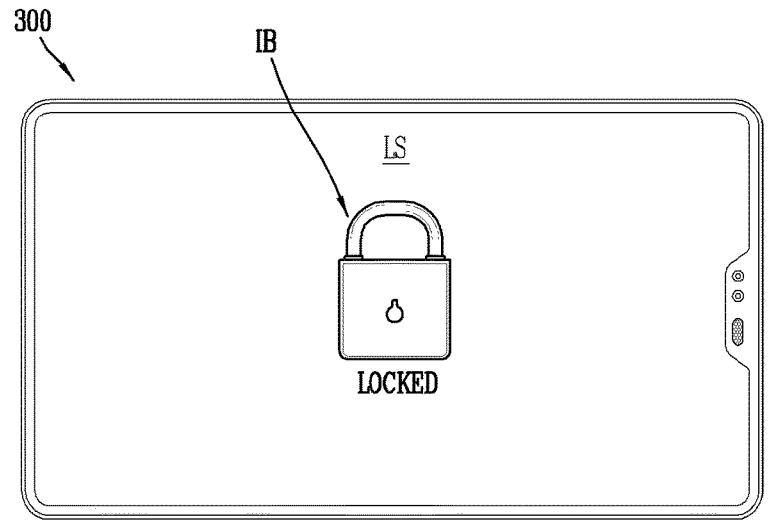
[Fig. 8a]
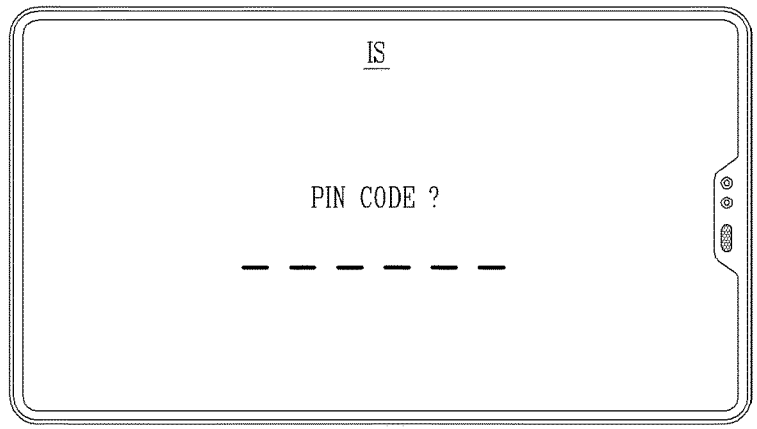
[Fig. 8b]
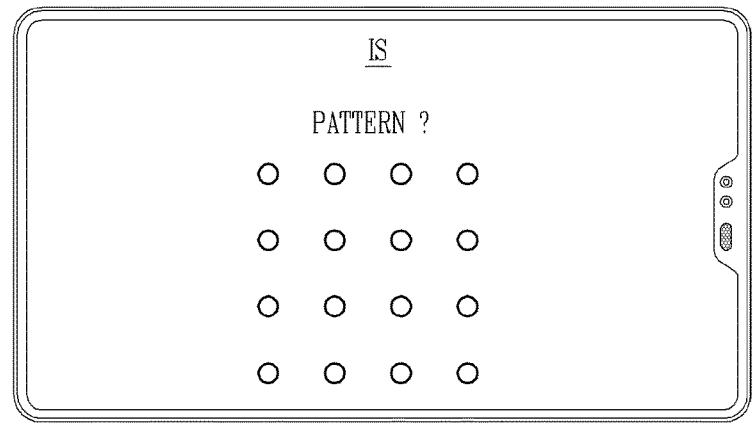

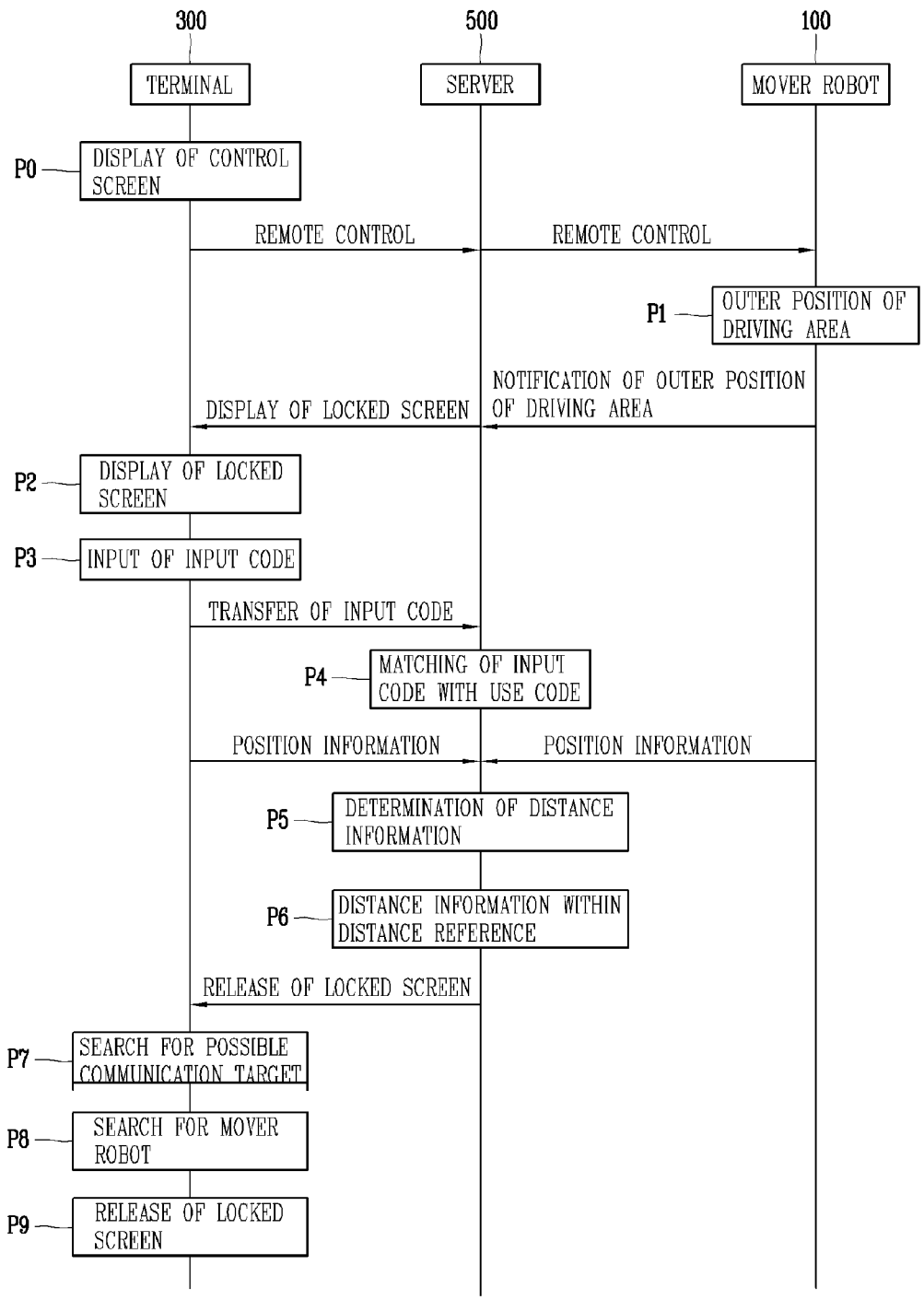
[Fig. 9]

[Fig. 10]
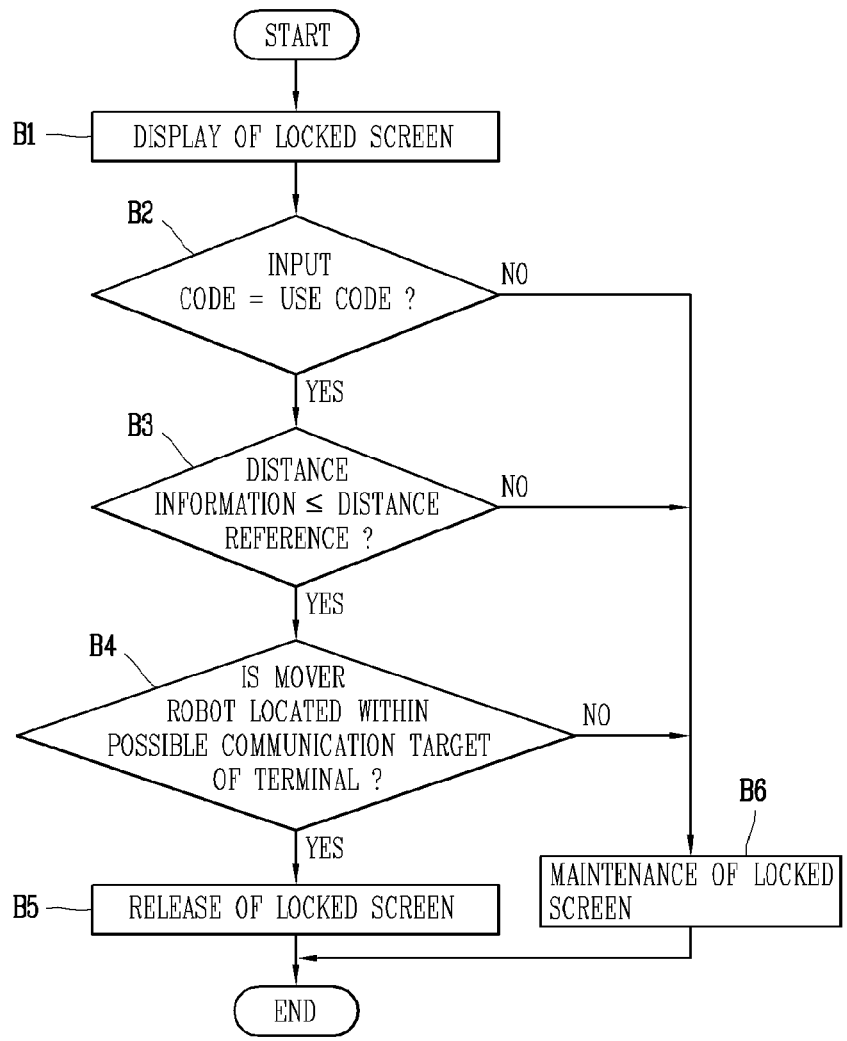

[Fig. 11]
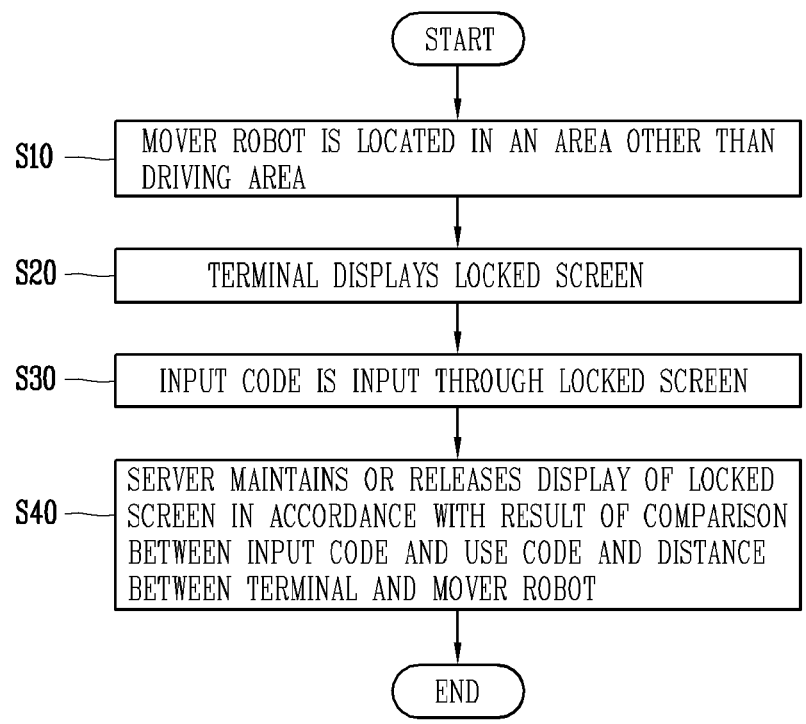

MOVER ROBOT SYSTEM AND CONTROLLING METHOD FOR THE SAME

CROSS-REFERENCE TO RELATED PATENT APPLICATIONS

This application is a U.S. National Stage Application under 35 U.S.C. § 371 of PCT Application No. PCT/KR2019/002045, filed Feb. 20, 2019, which claims priority to U.S. Provisional Application Ser. No. 62/653,567, filed Apr. 6, 2018 and Korean Patent Application No. 10-2019-0010730, filed Jan. 28, 2019, whose entire disclosures are hereby incorporated by reference.

TECHNICAL FIELD

The present invention relates to a lawn cutting mover robot system and a controlling method for the same that self-drives a driving area.

BACKGROUND ART

Generally, a mover robot is a machine that automatically performs a predetermined operation while self-driving a predetermined area even without any manipulation of a user. The mover robot senses an obstacle installed within an area and performs an operation by approaching or avoiding the obstacle.

This mover robot may include a lawn mover robot which cuts lawn on the ground of an area as well as a cleaning robot which performs cleaning while driving an area. Generally, a moving system includes a vehicle system which cuts lawn on the ground or cuts grass while moving in accordance with driving of a user in a state that the user gets on the vehicle system, and a work behind type or hand-held type system which cuts lawn while moving by being pushed or pulled manually by a user. This moving system which cuts lawn while moving by means of a direct manipulation of the user has an inconvenience in that the user should directly manipulate the system. Therefore, a mover robot type moving system comprising a lawn cutting means provided in a mover robot has been studied.

Since this mover robot (lawn cutter) for cutting lawn is operated outdoors not indoors, the mover robot drives an area wider than an area where a mover robot drives an indoor environment. In case of the indoor environment, the ground is simple and factors such as topography and landmark, which affect driving, are restrictive. However, since the outdoor environment is an open space, various factors of the outdoor environment affect driving and the outdoor environment is also greatly affected by topography. This mover robot which drives the outdoor environment may be remotely controlled through a terminal of a user, which corresponds to a communication target. For example, a control screen for an operation control of the mover robot may be displayed on the terminal, and the mover robot may be operated to correspond to a manipulation of the control screen.

However, if this remote control is performed, the remote control can be performed safely and exactly within only a viewing range of a manipulator who manipulates the remote control, that is, only a set driving area. For example, if the remote control is performed beyond a certain distance from the mover robot, the mover robot may not be controlled exactly depending on a spaced distance due to a communication environment and an external environment. This could lead to negligent accidents of people and animals existing on the area (including a driving area and the outside of the driving area) where the mover robot drives. Therefore, since the remote control cannot be performed safely and exactly for the area other than the driving area, there is limitation in the range of the remote control.

That is, the existing remote control has a problem in exactness and safety in the area other than the driving area. However, the technology for restricting the remote control in the area other than the driving area has not been suggested in the related art, and there is limitation in making sure of exactness and safety of the remote control in the area other than the driving area.

DISCLOSURE OF INVENTION

Technical Problem

Therefore, an object of the present invention is to obviate the limitation of the related art described as above.

In detail, another object of the present invention is to provide a mover robot system and a controlling method for the same, in which a remote control of a mover robot can be restricted in an area other than a driving area.

Also, other object of the present invention is to provide a mover robot system and a controlling method for the same, in which a remote control of a mover robot can be performed safely in an area other than a driving area.

Solution to Problem

A mover robot system and a controlling method for the same according to the present invention to achieve the above objects are intended to restrict a remote control of a mover robot through a terminal if the mover robot is located in an area other than a driving area.

In detail, the mover robot system and the controlling method for the same according to the present invention are characterized in that a manipulation of a control screen displayed on the terminal to perform a remote control is restricted if a mover robot is located in an area other than a driving area, and the manipulation of the control screen is released through a preset authentication procedure.

That is, in the mover robot system and the controlling method for the same according to the present invention, the manipulation of the control screen where the remote control is performed is restricted if the mover robot is located in the area other than the driving area, and a locked screen requesting an input of a preset use code is displayed on the terminal, whereby a display of the locked screen is maintained or released in accordance with an input code which is input.

In the mover robot system and the controlling method for the same according to the present invention, after the manipulation of the control screen where the remote control is performed is restricted, the restrictive manipulation of the control screen is released in a state that the remote control is able to be performed, whereby the aforementioned objects are achieved.

The mover robot system and the controlling method for the same according to the present invention described as above may be carried out by being applied to a lawn cutting robot, a controlling method for a lawn cutting robot, a control means of a lawn cutting robot, a lawn cutting robot system, a control system of a lawn cutting robot, a controlling method for a lawn cutting robot, and the like. In this specification, as a technical solution of the above technical features, the embodiments of the mover robot system and the controlling method for the same are provided.

To achieve these and other objects and in accordance with the purpose of the present invention, as embodied and broadly described herein, there is provided a mover robot system for cutting lawn within a driving area, which comprises a terminal for remotely controlling a mover robot through a manipulation of a control screen for an operation control of the mover robot by displaying the control screen on a display unit; a server for performing communication for the remote control with each of the terminal and the mover robot; and the mover robot for performing an operation in response to the manipulation of the control screen, wherein, if the mover robot cuts lawn in an area other than the driving area, the terminal restricts the manipulation of the control screen and displays a locked screen for requesting an input of a preset use code on the display unit, and the server displays the locked screen on the display unit, and maintains or releases a display of the locked screen in accordance an input code input to the locked screen.

Also, to achieve these and other advantages and in accordance with the purpose of the present invention, as embodied and broadly described herein, there is provided a controlling method for a mover robot system according to the present invention, which comprises a terminal for remotely controlling a mover robot, which cuts lawn within a driving area, through a manipulation of a control screen for an operation control of the mover robot by displaying the control screen on a display unit, a server for performing communication for the remote control with each of the terminal and the mover robot, and the mover robot for performing an operation in response to the manipulation of the control screen, the controlling method comprising a step of locating the mover robot in an area other than the driving area; a step of displaying a locked screen for restricting the manipulation of the control screen by means of the terminal; a step of inputting an input code in the terminal through the locked screen; and a step of maintaining or releasing the display of the locked screen in accordance with a result of comparison between the input code and a preset use code by means of the server and a distance between the terminal and the mover robot.

Advantageous Effects of Invention

In the mover robot system and the controlling method for the same according to the present invention, after the manipulation of the control screen where the remote control is performed is restricted, the restrictive manipulation of the control screen is released in a state that the remote control is able to be performed, whereby the remote control of the mover robot can be restricted in the area other than the driving area.

Also, in the mover robot system and the controlling method for the same according to the present invention, after the manipulation of the control screen where the remote control is performed is restricted, the restrictive manipulation of the control screen is released in a state that the remote control is able to be performed, whereby the remote control of the mover robot can be performed safely in the area other than the driving area.

Moreover, in the mover robot system and the controlling method for the same according to the present invention, the remote control of the mover robot is performed in the area other than the driving area, whereby a usage range of the mover robot can be enlarged.

As a result, in the mover robot system and the controlling method for the same according to the present invention, the limit of the related art can be overcome, and at the same time utility, reliability, stability and security in the field of the mover robot for lawn cutting can be enhanced.

BRIEF DESCRIPTION OF DRAWINGS

FIG. 1a is a conceptual view illustrating a driving principle of a mover robot system according to the present invention;

FIG. 1b is a conceptual view illustrating a signal flow between systems for position determination of a mover robot system according to the present invention;

FIG. 2 is a conceptual view illustrating one embodiment of a driving area of a mover robot according to the present invention;

FIG. 3a is a schematic view 'a' illustrating one embodiment of a mover robot according to the present invention;

FIG. 3b is a schematic view 'b' illustrating one embodiment of a mover robot according to the present invention;

FIG. 3c is a schematic view 'c' illustrating one embodiment of a mover robot according to the present invention;

FIG. 4 is a schematic view illustrating a detailed configuration of a mover robot according to the present invention;

FIG. 5 is an exemplary view illustrating that a mover robot is located in an area other than a driving area according to the embodiment of a mover robot system of the present invention;

FIG. 6 is an exemplary view illustrating a control screen according to the embodiment of a mover robot system of the present invention;

FIG. 7a is an exemplary view 'a' illustrating an example of a locked screen according to the embodiment of a mover robot system of the present invention;

FIG. 7b is an exemplary view 'b illustrating an example of a locked screen according to the embodiment of a mover robot system of the present invention;

FIG. 8a is an exemplary view 'a' illustrating an example of an input screen according to the embodiment of a mover robot system of the present invention;

FIG. 8b is an exemplary view 'b' illustrating an example of an input screen according to the embodiment of a mover robot system of the present invention;

FIG. 9 is an exemplary view illustrating a procedure of displaying and releasing a locked screen according to the embodiment of a mover robot system of the present invention;

FIG. 10 is a flow chart illustrating a procedure of performing a restriction function of a remote control according to the embodiment of a mover robot system of the present invention; and FIG. 11 is a flow chart illustrating a controlling method for a mover robot system of the present invention.

MODE FOR THE INVENTION

Hereinafter, a mover robot system and a controlling method for the same according to the present invention will be described in detail with reference to the accompanying drawings. Wherever possible, the same reference numbers will be used throughout the drawings to refer to the same or like parts and their repeated description will be omitted.

Also, in description of the embodiments disclosed in this specification, if detailed description of elements or functions known in respect of the present invention is determined to make the subject matter of the present invention unnecessarily obscure, the detailed description will be omitted. Also, it is to be understood that the accompanying drawings are intended to easily understand the embodiment disclosed in this specification and technical spirits disclosed in this specification should not be restricted by the accompanying drawings.

First of all, the embodiment of the mover robot system (hereinafter, referred to as "system") according to the present invention will be described.

The robot may mean an autonomous driving robot, a lawn cutting mover robot, a lawn cutting robot, a lawn cutter, or a mover robot for lawn cutting.

The system 1 may be a system of a mover robot (hereinafter, referred to as "robot") which cuts lawn within a driving area. In this case, the robot may be a lawn cutting robot. That is, the system 1 may be a driving/control/operation system of a lawn cutting robot which cuts lawn within the driving area.

The system 1, as shown in FIG. 1*a*, includes a terminal 300 for remotely controlling the robot 100 through a manipulation of a control screen for an operation control of the robot 100 by displaying the control screen on a display unit, a server 500 for performing communication for the remote control with each of the terminal 300 and the robot 100, and the robot 100 for performing an operation in response to the manipulation of the control screen. That is, the terminal 300 may display the control screen where the remote control of the robot 100 is performed on the display unit, and the mover robot 100 may be operated to cut lawn within the driving area while driving the driving area in accordance with the manipulation of the control screen. The server 500 may be a communication server for providing the control screen where the remote control of the robot 100 is performed to the terminal 300. The server 500 may perform communication with each of the terminal 300 and the robot 100 and control implementation of the remote control through the control screen. For example, the server 500 may control implementation of the remote control through the control screen by providing information for a display of the control screen to the terminal 300 and providing information according to the manipulation of the control screen to the robot 100. The system 1 may further include one or more of a transmitter 200 and a GPS satellite 400 for transmitting or receiving signals to or from one or more of the robot 100 and the terminal 300.

In the system 1, the robot 100 may be operated in accordance with the driving principle as shown in FIG. 1*a*, and a signal flow between systems for position determination may be performed as shown in FIG. 1*b*. Therefore, the robot 100 may drive a driving area 1000 as shown in FIG. 2.

The robot 100 can self-drive within the driving area 1000 shown in FIG. 2. The robot 100 may perform a specific operation in the middle of driving. In this case, the specific operation may be an operation for cutting lawn within the driving area 1000. The driving area 1000 is an area for driving and operation of the robot 100, and a predetermined outdoor/indoor area may be formed as the driving area 1000. For example, a garden, yard, etc. where the robot 100 cuts lawn may be formed as the driving area 1000. A charging device 500 for charging a driving power of the robot 100 may be installed in the driving area 1000, and the robot 100 may charge a driving power by docking with the charging device 500 installed in the driving area 1000.

The driving area 1000 may be formed as a certain boundary area 1200 as shown in FIG. 2. The boundary area 1200 may correspond to a boundary line between the driving area 1000 and an outer area 1100, and thus may allow the robot 100 to drive without departing from the outer area 1100 within the boundary are 1200. In this case, the boundary area 1200 may be formed as a closed curve or closed loop. Also, in this case, the boundary area 1200 may be defined by a wire 1200 formed as a closed curve or closed loop. The wire 1200 may be installed in a random area, and the robot 100 may drive within the driving area 1000 of the closed curve formed by the installed wire 1200.

One or more transmitters 200 may be arranged in the driving area 1000 as shown in FIG. 2. The transmitters 200 are signal generating means for transmitting a signal for determining position information by means of the robot 100, and may distributively be arranged in the driving area 1000. The robot 100 may determine a current position based on a result obtained by receiving the signal transmitted from the transmitter 200 or determine position information on the driving area 1000. In this case, the robot 100 may receive the signal through a receiving unit which receives the signal. Preferably, the transmitter 200 may be arranged near the boundary area 1200 in the driving area 1000. In this case, the robot 100 may determine the boundary area 1200 on the basis of the arrangement position of the transmitter 200 arranged near the boundary area 1200.

The robot 100 may perform communication with the terminal 300 which moves along a predetermined area as shown in FIG. 1*a*, and may drive while following the position of the terminal 300 based on the data received from the terminal 300. The robot 100 may set a virtual boundary in a predetermined area on the basis of the position information received from the terminal 300 or collected in the middle of driving while following the terminal 300, and may set an inner area formed by the boundary to the driving area 1000. If the boundary area 1200 and the driving area 1000 are set, the robot 100 may drive within the driving area 1000 so as not to depart from the boundary area 1200. As the case may be, the terminal 300 may set the boundary area 1200 and transmit the set boundary area 1200 to the robot 100. If the terminal 300 changes or enlarges the area, the terminal 300 may transmit the changed information to the robot 100 to allow the robot 100 to drive in a new area. Also, the terminal 300 may monitor the operation of the robot 100 by displaying data received from the robot 100 on the screen.

The robot 100 or the terminal 300 may determine the current position by receiving the position information. The robot 100 and the terminal 300 may determine the current position based on the position information transmitted from the transmitter 200 arranged in the driving area 1000 or a GPS signal using the GPS satellite 400. The robot 100 and the terminal 300 may determine the current position by comparing the signals transmitted from the transmitter 200, preferably three transmitters 200. That is, three or more transmitters 200 may preferably be arranged in the driving area 1000.

After the robot 100 sets any one point within the driving area 1000 to a reference position, the robot 100 calculates a position during movement as a coordinate. For example, the robot 100 may set an initial starting position, that is, a position of the charging device 500 to the reference position. Also, the robot 100 may calculate a coordinate for the driving area 1000 by using a position of any one of the transmitters 200 as a reference position. Also, the robot 100 may set the initial position to the reference position every operation and then determine the position while driving. The robot 100 may compute a driving distance from the reference position based on RPM and rotation speed of a driving wheel 11, a rotation direction of a main body 10, etc. and thus determine the current position within the driving area 1000. Even in the case that the robot 100 determines the position by using the GPS satellite 400, the robot 100 may determine the position by using any one point as the reference position.

The robot 100, as shown in FIG. 1b, may determine the current position based on the position information transmitted from the transmitter 200 or the GPS satellite 400. The position information may be transmitted in the form of GPS signal, ultrasonic signal, infrared signal, electromagnetic signal or ultra wide band (UWB) signal. Preferably, the signal transmitted from the transmitter 200 may be the UWB signal. Therefore, the robot 100 may receive the UWB signal transmitted from the transmitter 200 and determine the current position based on the received UWB signal.

In this way, as shown in FIG. 3a, the robot 100 which cuts lawn while driving the driving area 1000 may include a main body 10, a driving unit 11 for moving the main body 10, a grass cutting unit 30 for cutting lawn on the ground during driving, and a controller 20 for controlling driving and grass cutting operation of the robot 100 by controlling the driving unit 11 and the grass cutting unit 30.

The robot 100 may be an autonomous robot which is movably provided as shown in FIGS. 3b and 3c and includes the main body 10 which can cut lawn. The main body 10 includes one or more means which form appearance of the robot 100 and perform an operation such as driving and lawn cutting of the robot 100. The main body 10 is provided with the driving unit 11 which can move the main body 10 to a desired direction and rotate the main body 10. The driving unit 11 may include a plurality of rotatable driving wheels, each of which may be rotated individually to allow the main body 10 to be rotated in a desired direction. In more detail, the driving unit 11 may include at least one main driving wheel 11a and a sub wheel 11b. For example, the main body 10 may include two main driving wheels 11a which may be installed on the bottom at the rear of the main body 10.

The robot 100 may control driving of the main body 10 by controlling the driving unit 11 such that the controller 20 determine the current position of the main body 10 to drive within the driving area 1000, and may control the main body 10 to allow the grass cutting unit 30 to cut lawn on the ground while the main body 10 is driving the driving area 1000, whereby driving and grass cutting operation of the robot 100 may be controlled.

The robot 100 operated as above may include the main body 10, the driving unit 11, the grass cutting unit 30 and the controller 20 as shown in FIG. 4, and thus may cut lawn while driving the driving area 1000. The robot 100 may further include one or more of a camera unit 12, a communication unit 13, an output unit 14, a memory unit 15, a sensing unit 16, a receiving unit 17, an input unit 18 and an obstacle sensing unit 19.

The driving unit 11 may rotatably be driven by the driving wheels provided below the main body 10 to move the main body 10. That is, the driving unit 11 may be driven such that the main body 10 may drive the driving area 1000. The driving unit 11 may include at least one driving motor to move the main body 10 such that the robot 100 may drive. For example, the driving unit 11 may include a left-wheel driving motor for rotating a left-wheel and a right-wheel driving motor for rotating a right-wheel.

The driving unit 11 may transfer information on the driving result to the controller 20 and receive a control command on the operation from the controller 20. The driving unit 11 may be operated in accordance with the control command transferred from the controller 20. That is, the driving unit 11 may be controlled by the controller 20.

The camera unit 12 may be a camera for taking the periphery of the main body 10. The camera unit 12 may generate image information on the driving area 1000 of the main body 10 by taking the periphery of the main body 10. The camera unit 12 may sense the periphery of the main body 10 and an obstacle existing on the driving area 1000 by taking the front of the main body 10. The camera unit 12 is a digital camera, and may include an image sensor (not shown) and an image processor (not shown). The image sensor is a device for converting an optical image to an electric signal, and is comprised of a chip integrated with a plurality of photodiodes. An example of the photodiodes may include a pixel. Charges are accumulated in the respective pixels by an image formed on the chip by light which has passed through a lens. The charges accumulated in the pixels are converted to electric signals (for example, voltage). A CCD (Charge Coupled Device), a CMOS (Complementary Metal Oxide Semiconductor), etc. are known as the image sensors. Also, the camera unit 12 may include an image processor (DSP) for generating the image information by image-processing the image-pickup result.

The camera unit 12 may transfer the image-pickup result to the controller 20, and may receive the control command for the operation from the controller 20. The camera unit 12 may be operated in accordance with the control command transferred from the controller 20. That is, the camera unit 12 may be controlled by the controller 20.

The communication unit 13 may perform communication with one or more communication target means which perform communication with the robot 100. The communication unit 13 may perform communication with the transmitter 200 and the terminal 300 in a wireless communication mode. Also, the communication unit 13 may perform communication with the terminal 300 which controls the robot 100 and the server 500. If the communication unit 13 performs communication with the terminal 300, the communication unit 13 may transmit a generated map to the terminal 300, receives a command from the terminal 300, and transmit data for the operation state of the robot 100 to the terminal 300. The communication unit 13 may include a short-range wireless communication such as zigbee and Bluetooth and a communication module such as Wi-Fi and Wibro to transmit or receive data.

The communication unit 13 may transfer information on the communication result to the controller 20, and may receive the control command for the operation from the controller 20. The communication unit 13 may be operated in accordance with the control command transferred from the controller 20. That is, the communication unit 13 may be controlled by the controller 20.

The output unit 14 is an output means for outputting information on the state of the robot 100 in the form of audio, and may include a speaker, for example. The output unit 14 may output an alarm related to an event when the event occurs in the middle of the operation of the robot 100. For example, when a driving power of the robot 100 is exhausted, an impact is applied to the robot 100, or an accident occurs on the driving area 1000, the output unit 14 may output alarm audio to transfer this information to a user.

The output unit 14 may transfer information on the operation state to the controller 20, and may receive the control command for the operation from the controller 20. The output unit 14 may be operated in accordance with the control command transferred from the controller 20. That is, the output unit 14 may be controlled by the controller 20.

The memory unit 15 is a memory means for storing data that can be read by a microprocessor, and may include an HDD (Hard Disk Drive), an SSD (Solid State Disk), an SDD (Silicon Disk Drive), a ROM, a RAM, a CD-ROM, a magnetic tape, floppy disk, and an optical data memory device. A signal which is received, reference data for determining an obstacle, and information on an obstacle which is sensed may be stored in the memory unit 15. Also, control data for controlling the operation of the robot 100, data according to an operation mode of the robot 100, collected position information, and information on the driving area 1000 and its boundary 1200 may be stored in the memory unit 15.

The sensing unit 16 may include one or more sensors for sensing information on a posture and operation of the main body 10. The sensing unit 16 may include one or more of a slope sensor fore sensing a movement of the main body 10 and a speed sensor for sensing a driving speed of the driving unit 11. The slope sensor may be a sensor for sensing posture information of the main body 10. If the main body 10 is inclined in forward, backward, left and right directions, the slope sensor may sense posture information of the main body 10 by calculating the inclined direction and angle. A tilt sensor, an acceleration sensor, etc. may be used as the slope sensor. Any one of a gyro sensor, an inertia sensor and a silicon semiconductor sensor may be used as the acceleration sensor. In addition to these sensors, various sensors or devices which can sense a movement of the main body 10 may be used. The speed sensor may be a sensor for sensing a driving speed of the driving wheels provided in the driving unit 11. The speed sensor may sense a driving speed by sensing a rotation of the driving wheels if the driving wheels are rotated.

The sensing unit 16 may transfer information on the sensed result to the controller 20, and may receive the control command for the operation from the controller 20. The sensing unit 16 may be operated in accordance with the control command transferred from the controller 20. That is, the sensing unit 16 may be controlled by the controller 20.

The receiving unit 17 may include a plurality of sensor modules for transmitting or receiving position information. The receiving unit 16 may include a position sensor module for receiving the signal from the transmitter 200. The position sensor module may transmit the signal to the transmitter 200. If the transmitter 200 transmits the signal in any one of an ultrasonic wave mode, a UWB (Ultra Wide Band) mode, and an infrared mode, the receiving unit may 17 may include a sensor module for transmitting or receiving a ultrasonic wave, UWB or infrared signal in response to the transmitted signal. Preferably, the receiving unit 17 may include a UWB sensor. For reference, the UWB wireless technology means that a wide frequency band of several GHz or more instead of a radio frequency (RF) carrier is used in a baseband. The UWB wireless technology uses a very narrow pulse of several nano seconds or several pico seconds. In this way, since the pulse emitted from the UWB sensor has several nano seconds or several pico seconds, penetrability is good, whereby the receiving unit 17 may receive a very short pulse emitted from another UWB sensor even though an obstacle exists near the receiving unit.

If the robot 100 drives while following the terminal 300, the terminal 300 and the robot 100 may respectively include a UWB sensor to mutually transmit or receive a UWB signal through the UWB sensor. The terminal 300 may transmit the UWB signal through the UWB sensor provided therein, and the robot 100 may determine the position of the terminal 300 based on the UWB signal received through the UWB sensor and thus move while following the terminal 300. In this case, the terminal 300 is operated as a transmitting side, and the robot 100 is operated as a receiving side. If the transmitter 200 includes a UWB sensor to transmit a signal, the robot 100 or the terminal 300 may receive the signal transmitted from the transmitter 200 through the UWB sensor provided therein. At this time, a signal mode of the transmitter 200 and a signal mode of the robot 100 and the terminal 300 may be equal to or different from each other.

The receiving unit 16 may include a plurality of UWB sensors. If two UWB sensors are included in the receiving unit 17, for example, the UWB sensors are respectively provided at left and right sides of the main body 10 to receive signals, whereby the received signals may be compared with each other to calculate an exact position. For example, if a distance measured by the left sensor is different from a distance measured by the right sensor in accordance with the position of the robot 100 and the transmitter 200 or the terminal 300, a relative position between the robot 100 and the transmitter 200 or the terminal 300 and a direction of the robot 100 may be determined based on the different distance.

The receiving unit 17 may further include a GPS module for transmitting or receiving a GPS signal from the GPS satellite 400.

The receiving unit 17 may transfer the received result of the signal to the controller 20, and may receive the control command for the operation from the controller 20. The receiving unit 17 may be operated in accordance with the control command transferred from the controller 20. That is, the receiving unit 17 may be controlled by the controller 20.

The input unit 18 may display the state of the robot 100 through the display unit and display the control screen where a control manipulation of the robot 100 is performed. The control screen may mean a user interface screen on which the driving state of the robot 100 is displayed and to which a command for a driving manipulation of the robot 100 is input. The control screen may be displayed on the display unit under the control of the controller 20, and a command displayed on and input to the control screen may be controlled by the controller 20.

The input unit 18 may transfer information on the operation state to the controller 20, and may receive the control command for the operation from the controller 20. The input unit 18 may be operated in accordance with the control command transferred from the controller 20. That is, the input unit 18 may be controlled by the controller 20.

The obstacle sensing unit 19 includes a plurality of sensors to sense an obstacle existing in a driving direction. The obstacle sensing unit 19 may sense an obstacle at the front of the main body 10, that is, in the driving direction by using at least one of a laser sensor, an ultrasonic sensor, an infrared sensor, and a 3D sensor. The obstacle sensing unit 19 may further include a cliff sensor provided on a rear surface of the main body 10 to sense a cliff.

The obstacle sensing unit 19 may transfer information on the sensed result to the controller 20, and may receive the control command for the operation from the controller 20. The obstacle sensing unit 19 may be operated in accordance with the control command transferred from the controller 20. That is, the obstacle sensing unit 19 may be controlled by the controller 20.

The grass cutting unit 30 cuts lawn on the ground in the middle of driving. The grass cutting unit 30 may be provided with a brush or knife blade for cutting lawn to cut lawn on the ground through rotation.

The grass cutting unit 30 may transfer information on the operation result to the controller 20, and may receive the control command for the operation from the controller 20.

The grass cutting unit 30 may be operated in accordance with the control command transferred from the controller 20. That is, the grass cutting unit 30 may be controlled by the controller 20.

The controller 20 may include a central processing unit to perform an overall operation control of the robot 100. The controller 20 may control driving of the main body 10 by determining the state of the driving area 1000 in the middle of driving the driving area 1000 through the main body 10, the driving unit 11 and the camera unit 12, and may control the communication unit 13, the output unit 14, the memory unit 15, the sensing unit 16, the receiving unit 17, the input unit 18, the obstacle sensing unit 19 and the grass cutting unit 30 to perform a function/operation of the robot 100.

The controller 20 may control input and output of data, and may control the driving unit 11 to allow the main body 10 to drive in accordance with setup. The controller 20 may control the operation of the left-wheel driving motor and the right-wheel driving motor independently by controlling the driving unit 11, whereby the main body 10 may drive in a straight direction or through rotation.

The controller 20 may set the boundary 1200 for the driving area 1000 based on the position information received from the terminal 300 or the position information determined based on the signal received from the transmitter 200. The controller 20 may also set the boundary 1200 for the driving area 1000 based on the position information collected in the middle of driving. The controller 20 may set any one of areas formed by the boundary 1200, which is set, to the driving area 1000. The controller 20 may set the boundary 1200 in the form of a closed loop by connecting discontinuous position information in a line or curve and set an inner area as the driving area 1000. If the driving area and the boundary 1200 according to the driving area 1000 are set, the controller 20 may control driving of the main body 10 so as not to depart from the set boundary 1200 while driving within the driving area. The controller 20 may determine the current position based on the received position information and control driving of the main body 10 by controlling the driving unit 11 such that the determined current position may be within the driving area 1000.

Also, in accordance with information on an obstacle input by one or more of the camera unit 12 and the obstacle sensing unit 19, the controller 20 may control driving of the main body 10 such that the main body 10 may drive by avoiding the obstacle. In this case, the controller 20 may correct the driving area 1000 by reflecting the obstacle information in area information on the driving area 1000, which is previously stored.

In this way, the robot 100, which includes the main body 10, the driving unit 11, the grass cutting unit 30 and the controller 20 and drives the driving area 1000, may perform the operation in accordance with a plurality of operation modes. In this case, the operation modes mean modes for performing the operation in accordance with a certain reference, and one of the operations modes may be set through the robot 100 or the terminal 300. Therefore, the terminal 300 may control the operation of the robot 100 by displaying the control screen according to the set operation mode, and the robot 100 may perform the operation in accordance with the operation mode. The system 1 may perform the operation control of the robot 100 and the operation according to the operation control in accordance with any one or more of the plurality of operation modes.

The system 1 is a system that controls the aforementioned robot 100, and may remotely control the robot 100 through the terminal 300 which remotely controls the robot 100 through the manipulation of the control screen by displaying the control screen on the display unit and the server 500 which performs communication for the remote control with each of the terminal 300 and the robot 100.

In the system 1 which includes the terminal 300, the server 500 and the robot 100, if the robot 100 cuts lawn in an area other than the driving area 1000, the terminal 300 restricts the manipulation of the control screen and displays a locked screen, which requests an input of a preset use code, on the display unit, and the server 500 displays the locked screen on the display unit and maintains or releases the display of the locked screen in accordance with an input code input to the locked screen. That is, as shown in FIG. 5, if the robot 100 is located in the outer area 1100 of the driving area 1000, the robot 100 may restrict the manipulation of the control screen by displaying the locked screen on the terminal 300.

The control screen CS is a screen for remotely controlling the operation of the robot 100, and may be displayed on the display unit of the terminal 300 as shown in FIG. 6. The control screen CS may be displayed on the terminal 300 by data provided from the server 500. That is, the control screen CS may be displayed through communication with the server 500. For example, if data for information which will be displayed on the control screen CS are transferred from the server 500 to the terminal 300, the terminal 300 may display the control screen CS based on the transferred data.

The control screen CS may include a joystick button JS for controlling the operation of the robot 100. The joystick button JS is a graphic object for controlling driving and cutting operations of the robot 100, and in accordance with a manipulation input on the joystick button JS, the robot 100 may be operated. The manipulation input may mean an input according to a manipulation of a user for the control screen CS. The manipulation input may an input according to one or more manipulations of a touch and a drag. For example, the manipulation input may be a touch and drag input of the user for the joystick button JS. The joystick button JS may include a driving control button for controlling the driving operation of the robot 100 and a cutting control button for controlling the cutting operation of the robot 100. The control screen CS may further include a state button IB indicating the state of the remote control. The state button IB may be displayed in the form of a graphic object indicating whether the control screen CS is restricted.

The locked screen LS is a screen for restricting the manipulation of the control screen CS and requesting an input of the use code, and may be displayed on the display unit of the terminal 300 as shown in FIGS. 7a to 7b. The locked screen LS may be displayed on the terminal 300 by the data provided from the server 500. That is, the locked screen LS may be displayed through communication with the server 500. For example, if data for information which will be displayed on the locked screen LS are transferred from the server 500 to the terminal 300, the terminal 300 may display the locked screen LS based on the transferred data. The locked screen LS, as shown in FIG. 7a, may be a screen where the state button IB is switched to a restrictive manipulation state on the control screen CS shown in FIG. 6. In this case, the manipulation performed on the control screen CS may be restricted. That is, the locked screen LS may be a screen where the manipulation on the control screen CS is restricted as shown in FIG. 7a. The locked screen LS, as shown in FIG. 7b, may be a screen where the display of the control screen CS shown in FIG. 6 is switched. In this case, the display of the control screen CS may be restricted. That is, the locked screen LS may be a screen where the display of the control screen CS is restricted as shown in FIG. 7b.

The locked screen LS may include an input button IB for inputting the input code. The input button IB may be displayed in the form of a graphic object indicating the restrictive state of the control screen CS. If the locked screen LS is as shown in FIG. 7a, the input button IB may be the state button IB. In this case, the input button IB may be displayed in the form indicating that the manipulation of the control screen CS is locked. If the locked screen LS is as shown in FIG. 7b, the input button IB may be displayed in the form indicating that the manipulation of the control screen CS is locked. If the input button IB is selected and manipulated, the locked screen LS may display an input screen IS for inputting the input code. The input screen IS is a screen for requesting an input of the use code as shown in FIG. 8a or 8b, and may be displayed on the terminal 300 if the input button IB is selected and manipulated on the locked screen LS shown in FIGS. 7a and 7b.

The input code may be a code input in accordance with a manipulation input of the user on the input screen IS requesting an input the use code shown in FIGS. 8a and 8b. The input code may be a pin code made by combination of one or more of number, text and sign as shown in FIG. 8a, or may be a pattern code as shown in FIG. 8b. That is, the use code may be set to the pin code or the pattern code. The use code may be preset by the user of the terminal 300, whereby set code information may be stored in the server 500. Therefore, if the input code is input through the input screen IS, the server 500 may compare the input code with the preset use code and maintain or release the display of the locked screen LS in accordance with the compared result. That is, the locked screen LS may be displayed if the robot 100 is located in the area other than the driving area 1000, and the display of the locked screen LS may be maintained or released in accordance with the input result of the input code, whereby the restrictive manipulation of the control screen CS may be maintained or released.

The server 500 which displays the locked screen LS on the display unit and maintains or releases the display of the locked screen LS in accordance with the input code input to the locked screen LS may maintain the display of the locked screen LS if the input code is not matched with the use code. That is, the server 500 may maintain the restrictive manipulation of the control screen CS by maintaining the display of the locked screen LS if the use code is not input to the input screen IS. For detailed example, if the use code is set to a pin code [190124] of 6 digits and the input code input to the input screen IS shown in FIG. 8a is [180124], the input code is not matched with the use code, whereby the display of the locked screen LS may be maintained and thus the restrictive manipulation of the control screen CS may be maintained.

The server 500 which displays the locked screen LS on the display unit and maintains or releases the display of the locked screen LS in accordance with the input code input to the locked screen LS may release the display of the locked screen LS if the input code is matched with the use code. That is, the server 500 may release the restrictive manipulation of the control screen CS by releasing the display of the locked screen LS if the use code is input to the input screen IS. For detailed example, if the use code is set to a pattern code of [1×1-2×1-3×1-4×1] and the input code input to the input screen IS shown in FIG. 8a is [1×1-2×1-3×1-4×1], the input code is matched with the use code, whereby the display of the locked screen LS may be released and thus the restrictive manipulation of the control screen CS may be released.

The server 500 may release the display of the locked screen LS in accordance with the distance between the terminal 300 and the robot 100 if the input code is matched with the use code. That is, the server 500 may release the display of the locked screen LS if the input code is matched with the use code and the distance between the terminal 300 and the robot 100 corresponds to a certain condition. Therefore, the restrictive manipulation of the control screen CS may be performed depending on whether the use code is input and the distance between the terminal 300 and the robot 100.

The server 500 may determine distance information between the terminal 300 and the robot 100 based on position information transferred from each of the terminal 300 and the robot 100 and release the display of the locked screen LS in accordance with the distance information. The position information may be GPS position information determined due to the GPS satellite 400. That is, the position information may be GPS information. Therefore, the server 500 may determine the distance information based on GPS information of the terminal 300 and GPS information of the robot 100, which are respectively transferred from the terminal 300 and the robot 100. In this case, the distance information may be information of an absolute distance according to the GPS information of each of the terminal 300 and the robot 100. That is, if the input code is matched with the use code, the server 500 may release the display of the locked screen LS in accordance with the absolute distance according to the GPS information of each of the terminal 300 and the robot 100.

As a result of comparison between the distance information and a preset distance reference, if the distance information is within the distance reference, the server 500 may release the display of the locked screen LS. That is, if the input code is matched with the use code and the distance information on the absolute distance between the terminal 300 and the robot 100 is less than the distance reference, the server 500 may release the display of the locked screen LS. Therefore, if the input code is matched with the use code and the terminal 300 and the robot 100 are located within the distance reference, the restrictive manipulation of the control screen CS may be released. The distance reference may be stored in the server 500 as preset information. The distance reference may be set to 10 [m], for example. According to this distance reference, if the input code is matched with the use code and the distance information is within 10 [m], the server 500 may release the restrictive manipulation of the control screen CS by releasing the display of the locked screen LS.

In this way, if the input code is matched with the use code and the distance information is within the distance reference, the server 500 which releases the display of the locked screen LS may transfer information on display release of the locked screen LS to the terminal 300, whereby the terminal 300 may release the display of the locked screen LS. In this case, the terminal 300 may maintain or release the display of the locked screen LS in accordance with the current position of the robot 100.

If the display release of the locked screen LS is transferred from the server 500, the terminal 300 may search for a possible communication target at the current position and maintain or release the display of the locked screen LS in accordance with the searched result. For example, the terminal 300 may maintain or release the display of the locked screen LS in accordance with the searched result for a possible communication target for WiFi communication at the current position. That is, if the input code is matched with the use code and the distance information is within the distance reference and thus the display release of the locked screen LS is transferred from the server 500, the terminal 300 may maintain or release the display of the locked screen LS in accordance with the searched result for the possible communication target.

If the robot 100 is not searched as the possible communication target, the terminal 300 may maintain the display of the locked screen LS. If the robot 100 is searched as the possible communication target, the terminal 300 may release the display of the locked screen LS. That is, if the input code is matched with the use code, the distance information is within the distance reference and the terminal 300 is able to perform communication with the robot 100 at the current position, the display of the locked screen LS may be released, whereby the restrictive manipulation of the control screen CS may be released.

In this way, in the system 1 in which the display of the locked screen LS is released if the input code is matched with the use code, the distance information is within the distance reference and the robot 100 is searched as the possible communication target, if the robot 100 is operated by the remote control in the area other than the driving area 1000, the robot 100 may be operated by quitting boundary sensing of the driving area 1000. Therefore, the driving and cutting operation in the outer area 1100 other than the driving area 1000 may easily be performed.

The display and release of the locked screen LS, of which display is released if the input code is matched with the use code, the distance information is within the distance reference and the robot 100 is searched as the possible communication target, may be performed by a procedure shown in FIG. 9.

As shown in FIG. 9, when the robot 100 is remotely controlled, the terminal 300 may display the control screen CS on the display unit (P0), and may remotely control the robot 100 in accordance with the manipulation of the control screen CS through the server 500. The server 500 may transfer information according to the manipulation of the control screen CS, which is transferred from the terminal 300, to the robot 100, and may control implementation of the remote control by controlling the robot 100 such that the robot 100 may be operated in accordance with the manipulation of the control screen CS. If the robot 100 remotely controlled by the terminal 300 cuts lawn in the area other than the driving area 1000, that is, if the robot 100 is located (P1) in the outer area 1100 other than the driving area 1000 to cut lawn in the area other than the driving area 1000, the robot 100 may transfer information located in the outer area 1100 of the driving area 1000 to the server 500, and the server 500 may display the locked screen LS on the terminal 300 such that the manipulation of the control screen CS may be restricted in accordance with the transferred information. Therefore, the terminal 300 may display (P2) the locked screen LS on the display unit to restrict the manipulation of the control screen CS. Afterwards, if the input code is input (P3) to the input screen IS, the terminal 300 may transfer the input result of the input code to the server 500, and the server 500 may maintain or release the display of the locked screen LS in accordance with the input code.

As a result of comparison between the input code and the use code, if the input code is matched (P4) with the use code, the server 500 may request each of the terminal 300 and the robot 100 to transfer the position information, whereby the server 500 may receive the position information transferred from each of the terminal 300 and the robot 100. Afterwards, the server 500 may determine (P5) the distance information based on the position information and release the display of the locked screen LS in accordance with the result of comparison between the distance information and the distance reference. As a result of comparison between the distance information and the distance reference, if the distance information is within the distance reference (P6), the server 500 may release the display of the locked screen LS by transferring information on display release of the locked screen LS to the terminal 300.

If the information on display release of the locked screen LS is transferred from the server 500, the terminal 300 may release the display of the locked screen LS in accordance with the searched result (P7) for the possible communication target. As a result of the searched result (P7) for the possible communication target, if the robot 100 is searched (P8) as the possible communication target, the terminal 300 may release (P9) the locked screen LS. Therefore, the restrictive manipulation of the control screen CS may be released, whereby the robot 100 is able to be remotely controlled in the area other than the driving area 1000. If the robot 100 is able to be remotely controlled in the area other than driving area 1000, the robot 100 may be operated by quitting boundary sensing of the driving area 1000.

In the system 1 in which the display of the locked screen LS is released and thus the restrictive manipulation of the control screen CS is released if the input code is matched with the use code, the distance information is within the distance reference, and the terminal 300 corresponds to the possible communication target, a procedure of performing a restrictive function shown in FIG. 10 may be performed, whereby restriction and release of the remote control in the area other than the driving area 1000 may be performed. As described above, if the locked screen LS for restricting the manipulation of the control screen CS is displayed (B1) on the terminal 300, the input code and the use code are compared (B2) with each other. If the input code is matched with the use code, the distance information is compared (B3) with the distance reference. If the distance information is within the distance reference, it is checked (B4) whether the robot 100 is located within a possible communication range of the terminal 300. As a result, if the robot 100 corresponds to the possible communication target, the locked screen LS is released (B5), whereby the restriction of the remote control is released. If the input code is not matched with the use code, the distance information exceeds the distance reference, or the robot 100 does not correspond to the possible communication target, the locked screen LS is maintained (B6), whereby the restriction of the remote control may be maintained. That is, in the system 1, if the input code is matched with the use code, the distance information is less than the distance reference, and the robot 100 corresponds to the possible communication target of the terminal 300, the remote control in the area other than the driving area 1000 may be performed, and if any one of the above conditions is not fulfilled, the remote control in the area other than the driving area 1000 may be restricted.

A controlling method of the mover robot system (hereinafter, referred to as "controlling method"), which will be described below, may be applied to the above-described system 1.

Hereinafter, the controlling method will be described, and a repeated description of the description made in the above system 1 will be omitted.

The controlling method is a method for controlling the system 1 shown in FIGS. 1 and 1b, and may be applied to the above-described system 1. Also, the controlling method may be applied to a system in addition to the above-described system 1.

The controlling method is the controlling method of the system 1 comprising the terminal 300 for remotely controlling the robot 100 through the manipulation of the control screen for the operation control of the robot 100 by displaying the control screen on the display unit, the server 500 for performing communication for the remote control with each of the terminal 300 and the robot 100, and the robot 100 operating in response to the manipulation of the control screen, and may be a method for controlling implementation of the remote control in an area other than the driving area 1000.

The controlling method may be a method for restricting implementation of the remote control.

Also, the controlling method may be a method for controlling the robot 100 in the area other than the driving area 1000.

The controlling method, as shown in FIG. 11, includes a step S10 of locating the robot 100 in the area other than the driving area 1000, a step S20 of displaying the locked screen LS for restricting the manipulation of the control screen CS, a step S30 of inputting an input code in the terminal 300 through the locked screen LS, and a step S40 of maintaining or releasing the display of the locked screen LS in accordance with the result of comparison between the input code and the preset use code by means of the server 500 and the distance between the terminal 300 and the robot 100.

That is, the system 1 may control implementation of the remote control in the order of the locating step S10, the displaying step S20, the inputting step S30 and the maintaining or releasing step S40.

The controlling method may be performed if the remote control is performed.

That is, the controlling method may be a method performed in the middle of the remote control of the robot 100 through the control screen CS displayed on the terminal 300.

The locating step S10 may be a step of locating the robot 100 in the area other than the driving area 1000.

The locating step S10 may include locating the robot 100 in the outer area 1100 to cut lawn in the other area 1100 other than the driving area 1000.

The displaying step S20 may be a step of allowing the terminal 300 to display the locked screen LS on the display unit by performing communication between the server 500 and the terminal 300 to restrict the manipulation of the control screen CS.

The displaying step S20 may include restricting the manipulation of the control screen CS by allowing the terminal 300 to display the locked screen LS on the display unit.

The inputting step S30 may be a step of inputting the input code to the locked screen LS by the manipulation of the user as the terminal 300 displays an input request of the use code through the locked screen LS.

The inputting step S30 may include inputting the input code through the input screen IS displayed if the input button IS included in the locked screen LS is selected and manipulated.

The inputting step S30 may include transferring the input result of the input code from the terminal 300 to the server 500 if the input code is input to the input screen IS.

The maintaining or releasing step S40 may be a step of maintaining or releasing the display of the locked screen LS depending on the result of comparison between the input code and the use code by means of the server 500 and whether the distance between the terminal 300 and the robot 100 corresponds to a certain condition.

The maintaining or releasing step S40 may include displaying the display of the locked screen LS if the input code is not matched with the use code.

The maintaining or releasing step S40 may include maintaining the display of the locked screen LS if the input code is matched with the use code and the distance between the terminal 300 and the robot 100 does not correspond to a preset reference condition.

The maintaining or releasing step S40 may include releasing the display of the locked screen LS if the input code is matched with the use code and the distance between the terminal 300 and the robot 100 corresponds to the reference condition.

The maintaining or releasing step S40 may include allowing the server 500 to request each of the terminal 300 and the robot 100 to transfer the position information and receiving the position information from each of the terminal 300 and the robot 100 if the input code is matched with the use code as a result of comparison between the input code and the use code.

The maintaining or releasing step S40 may include allowing the server 500 to receive the position information from each of the terminal 300 and the robot 100 and determine the distance information based on the position information if the input code is matched with the use code, and include maintaining or releasing the display of the locked screen LS in accordance with the result of comparison between the distance information and the distance reference.

The maintaining or releasing step S40 may include transferring information on display release of the locked screen LS to the terminal and maintaining the display of the locked screen LS if the distance information exceeds the distance reference as a result of comparison between the distance information and the distance reference as the input code is matched with the use code.

The maintaining or releasing step S40 may include transferring information on display release of the locked screen LS to the terminal 300 and releasing the display of the locked screen LS if the distance information is within the distance reference as a result of comparison between the distance information and the distance reference as the input code is matched with the use code.

In the controlling method for maintaining or releasing the display of the locked screen LS through the above order, the terminal 300 may maintain or release the display of the locked screen LS in accordance with the searched result for the possible communication target after the maintaining or releasing step S40.

As a result of the searched result for the possible communication target, if the robot 100 is not searched as the possible communication target, the terminal 300 may maintain the locked screen LS, and if the robot 100 is searched as the possible communication target, the terminal 300 may release the locked screen LS.

The controlling method comprising the locating step S10, the displaying step S20, the inputting step S30 and the maintaining or releasing step S40 may be implemented in a medium, in which a program is recorded, as a code that can be read by a computer. The medium that can be read by the computer includes all kinds of recording media in which data that can be read by a computer system are stored. Examples of the medium that can be read by the computer include an HDD (Hard Disk Drive), an SSD (Solid State Disk), an SDD (Silicon Disk Drive), a ROM, a RAM, a CD-ROM, a magnetic tape, floppy disk, an optical data memory device, and the like. Also, another example of the medium may be implemented in the form of carrier wave (for example, transmission through Internet). Also, the computer may include the controller 20.

The mover robot system and the controlling method for the same according to the present invention described as above may be carried out by being applied to a lawn cutting robot, a controlling method for a lawn cutting robot, a control means of a lawn cutting robot, a lawn cutting robot system, a control system of a lawn cutting robot, a controlling method for a lawn cutting robot, and the like. However, without limitation to this case, the disclosure in this specification may be carried out by being applied to all mover robots, control means for controlling the mover robots, mover robot systems and methods for controlling the mover robots, to which the technical spirits of the above disclosure are applicable.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The foregoing embodiments and advantages according to the present invention are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A mover robot system for cutting lawn within a driving area, the mover robot system comprising:
a terminal for remotely controlling a mover robot through a manipulation of a control screen for an operation control of the mover robot by displaying the control screen on a display unit;
a server for performing communication for the remote control with each of the terminal and the mover robot; and
the mover robot for performing an operation in response to the manipulation of the control screen,
wherein, if the mover robot cuts lawn in an area other than the driving area, the terminal restricts the manipulation of the control screen and displays a locked screen for requesting an input of a preset use code on the display unit, and the server displays the locked screen on the display unit, and maintains or releases a display of the locked screen in accordance an input code input to the locked screen.

2. The mover robot system of claim 1, wherein the locked screen includes an input button for inputting the input code, and displays an input screen for inputting the input code if the input button is selected and manipulated.

3. The mover robot system of claim 1, wherein the server maintains the display of the locked screen if the input code is not matched with the use code.

4. The mover robot system of claim 1, wherein the server releases the display of the locked screen if the input code is matched with the use code.

5. The mover robot system of claim 4, wherein the server releases the display of the locked screen in accordance with a distance between the terminal and the mover robot if the input code is matched with the use code.

6. The mover robot system of claim 5, wherein the server determines distance information between the terminal and the mover robot based on position information transferred from each of the terminal and the mover robot, and releases the display of the locked screen in accordance with the distance information.

7. The mover robot system of claim 6, wherein the server releases the display of the locked screen if the distance information is within a preset distance reference as a result of comparison between the distance information and the preset distance reference.

8. The mover robot system of claim 7, wherein the terminal searches for a possible communication target at a current position and maintains or releases the display of the locked screen in accordance with the searched result if a display release of the locked screen is transferred from the server.

9. The mover robot system of claim 8, wherein the terminal releases the display of the locked screen if the mover robot is searched as the possible communication target.

10. The mover robot system of claim 1, wherein the mover robot operates by quitting boundary sensing of the driving area if it operates in the area other than the driving area by means of the remote control.

11. A controlling method for a mover robot system comprising a terminal for remotely controlling a mover robot, which cuts lawn within a driving area, through a manipulation of a control screen for an operation control of the mover robot by displaying the control screen on a display unit, a server for performing communication for the remote control with each of the terminal and the mover robot, and the mover robot for performing an operation in response to the manipulation of the control screen, the controlling method comprising:
a step of locating the mover robot in an area other than the driving area;
a step of displaying a locked screen for restricting the manipulation of the control screen by means of the terminal;
a step of inputting an input code in the terminal through the locked screen; and
a step of maintaining or releasing the display of the locked screen in accordance with a result of comparison between the input code and a preset use code by means of the server and a distance between the terminal and the mover robot.

12. The controlling method for a mover robot system of claim 11, wherein the step of maintaining or releasing the display of the locked screen includes releasing the display of the locked screen if the input code is matched with the use code and the distance between the terminal and the mover robot corresponds to a preset reference condition.

* * * * *